United States Patent [19]
Gerber

[11] 3,842,941
[45] Oct. 22, 1974

[54] SOUND-DAMPING INSTALLATION FOR RUNNING-UP AIRCRAFT

[75] Inventor: Oskar Gerber, Stuttgart-Degerloch, Germany

[73] Assignee: Oskar Gerber Schall-u. Schwingungstechnik GmbH, Stuttgart-Degerlock, Germany

[22] Filed: Apr. 17, 1972

[21] Appl. No.: 244,603

[30] Foreign Application Priority Data
Aug. 17, 1971 Germany.................... 2141689

[52] U.S. Cl..................... 181/33 HB, 52/29, 52/65, 52/126
[51] Int. Cl........................................... E04b 1/342
[58] Field of Search ........ 181/33 H, 33 HA, 33 HB; 52/29, 65, 126; 214/16.1 A

[56] References Cited
UNITED STATES PATENTS

| 1,101,372 | 6/1914 | Wisniewski | 52/29 |
| 1,428,139 | 9/1922 | Brown | 52/65 X |
| 2,964,144 | 12/1960 | Wheeler | 52/65 |
| 3,252,688 | 5/1966 | Wiggins | 52/126 X |
| 3,398,843 | 8/1968 | Smith | 52/65 X |
| 3,645,053 | 2/1972 | Taggart | 52/65 |

FOREIGN PATENTS OR APPLICATIONS

| 1,245,576 | 7/1967 | Germany | 181/33 HB |
| 1,273,167 | 7/1968 | Germany | 181/33 HB |
| 774,550 | 5/1957 | Great Britain | 181/33 HB |
| 847,482 | 9/1960 | Great Britain | 181/33 HB |
| 442,705 | 1/1968 | Switzerland | 181/33 HB |

Primary Examiner—Richard B. Wilkinson
Assistant Examiner—John F. Gonzales
Attorney, Agent, or Firm—George Vande Sande

[57] ABSTRACT

A structure into which an aircraft may be placed during engine run-up, the structure being particularly adapted to abate the noise which results from such run-up operation. The structure comprises a rotatable floor element onto which the aircraft may be placed. A roof element is provided which is rotatable with the floor element and also may be selectively raised and lowered vertically. Between the floor and roof elements a plurality of screen elements are provided at least some of which are rotatable about a vertical axis. The entire structure may be rotated so as to align the aircraft with the direction of the wind during engine run-up.

2 Claims, 2 Drawing Figures a# SOUND-DAMPING INSTALLATION FOR RUNNING-UP AIRCRAFT

BACKGROUND OF THE INVENTION

The invention relates to an installation for running-up aircraft.

Sound-damping hangars into which the aircraft must be conducted, or installations consisting of exhaust gas pipes and induction sound-dampers which are connected to the aircraft in the open air, are already known. Both arrangements suffer from the disadvantage that they can only be used for certain types of aircraft because of their structural design. The sound-damping hangars are also expensive to manufacture, and the sound-damping pipes may be unsatisfactory in respect of their damping effect (approximately 15 dB) which occurs only on the exhaust gas side.

A very substantial disadvantage of these known installations also resides in their susceptibility to wind. With different types of aircraft, they function successfully, unsuccessfully, or not at all, depending upon the direction of the wind. Thus, for example, fan-type engines of large jets can be very sensitive in their reaction to side winds. On the induction side, these engines require very precise air pressure conditions which, experience has shown, may not exist in the presence of side winds. At low rotational speeds, recirculation, i.e. induction of the exhaust gas, frequently occurs, and this leads to failure of the engines.

Known installations are often aligned in the direction of the prevailing wind time. However, they cannot compensate for changes in wind direction.

SUMMARY OF THE INVENTION

An object of the present invention is to rpovide a sounddamping running-up installation for aircraft, which makes it possible to align an aircraft and the damping arrangement into the wind.

The present invention comprises an aircraft run-up installation comprising a turn-table for carrying an aircraft which turn-table is disposed in a floor and below a roof, rotatable sound-damping elements which are provided between the floor disc and the roof.

BRIEF DESCRIPTION OF THE DRAWINGS

The invention will be explained in greater detail below with the aid of the drawings, which illustrate a preferred example of embodiment. In the drawings.

DETAILED DESCRIPTION OF THE PREFERRED EMBODIMENT

Figure 1:
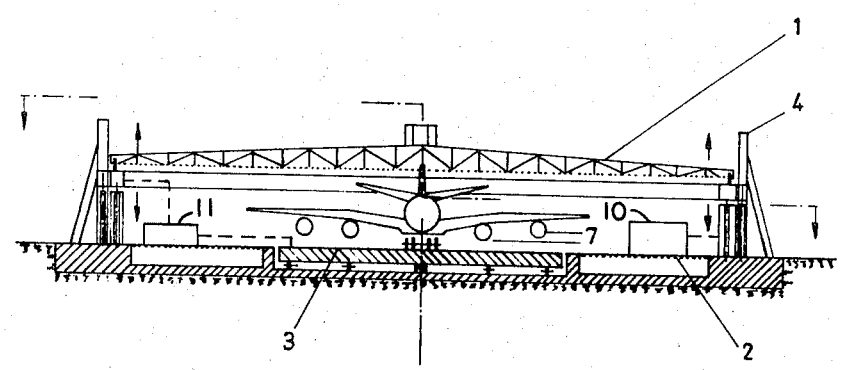
FIG. 1 shows an elevation, along the cross-section I-I in FIG. 2, of the aircraft running-up installation according to the invention.
Figure 2:
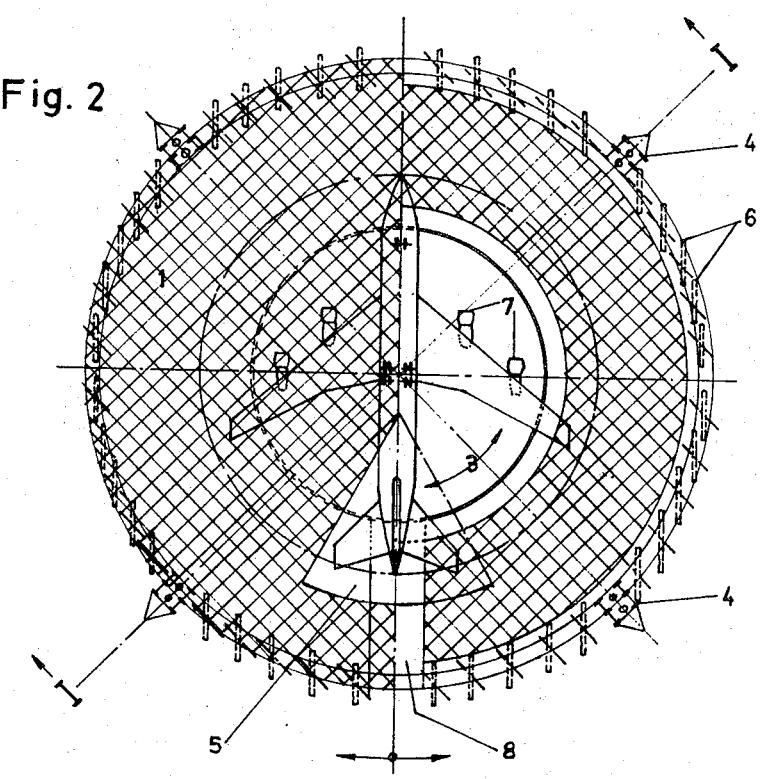
FIG. 2 shows a plan view of the same aircraft running-up installation.

The aircraft running-up installation shown in FIG. 1 comprises a disc-type sound- damper having an upper roof disc 1, which is constructed as a roof, and a floor disc 2. Both discs have, on their inner sides, absorption and/or resonance type sound-dampers, which are filled with sound-absorbing material. A turn-table 3, on which the aircraft to be tested is anchored during the course of the test, is countersunk in the center of the floor disc 2. The cover disc 1 is attached to a supporting frame 4 and can be adjusted in its height by an electric or hydraulic drive system. Various types of apparatus may be used for selectively lowering and raising the roof disc 1, a typical example of such apparatus being shown in U.S. Pat. No. 3,252,688, issued to J. H. Wiggins on May 24, 1966. Such means is diagrammatically illustrated in FIG. 1 by the reference character 10. At one point in the cover disc 1, which can be rotated synchronously with the turn-table 3, there is located a cut-out portion 5 through which the rudder assembly of the aircraft projects when the cover-disc is lowered to the prescribed level. The space between the discs 1 and 2, which is open on all sides, is not closed by rigid walls, but is exclusively bounded by sound-damping elements 6. These sound-damping elements 6 may, for example, consist of sound-damping screens the height of which reaches slightly above the engines 7 attached to the wings. The screens are rotatably disposed so that they can be aligned in the direction of the wind. Such screens may, for example, be pivotally supported and adapted for rotation as shown in U.S. Pat. No. 3,645,053, issued to G. Taggart on Feb. 29, 1972.

In the floor disc 2, there are provided, opposite the cut-out proportion 5 in the cover disc 1, concrete tracks 8, on which the aircraft is moved onto the turn-table 3. In order to enable the aircraft to enter on these concrete tracks, it is necessary for the sound-damping elements 6 disposed at this point to be laterally disposed, lowered or briefly removable in a simple manner. After the aircraft has been pushed onto the turn-table 3 and anchored on the latter in a suitable manner, it is turned into the wind by means of a turn-table 3 and the cover disc 1 which rotates synchronously with the latter. The desired synchronous rotation of the cover disc 1 with turntable 3 can be effected in any of several ways which will be readily apparent to one skilled in the art. For example, each part can be rotated by its respective associated electric motor, which motors can be synchronous motors operating from the same alternating-current source. Alternatively, a single prime mover can be used with an appropriate gear drive which can very simply be provided since all that is required is to ensure that elements 1 and 3 rotate with the same angular velocity. Whichever means is used, the means is illustrated diagrammatically in FIG. 1 where it is represented by the reference character 11.

Instead of an acoustically rigid roof surface with sound dampers disposed below it, it is also possible to provide, as the upper cover disc 1, a disc which consists of screens and is open in the upward direction.

Sound-dampers constructed in a disc arrangement are known in principle in noise-abatement technology. In sound-dampers of this kind, both the discs, which may be provided with sound-damping materials, are always orientated perpendicularly to the main direction of the noise. These installations have hitherto not been used for omnidirectional noise-emitters which emit noise with almost equal intensity in all directions. In particular, it has not hitherto been recognised that a disturbing wind influence in aircraft running-up installations can easily be eliminated with the aid of disc-type sound-dampers of this kind.

A crucial advantage of the aircraft running-up installation according to the invention lies in the fact that this installation can be used for all types of aircraft and therefore even for propeller aircraft, while the damping effect in all directions is between 20 and 25 dB. The installation can be adapted to an aircraft of any size because of the vertical adjustability of the cover disc, and to the wind direction prevailing at any particular time, because of the possibility of rotating the turn-table in conjunction with the cover disc.

What I claim is:

1. A structure for housing an aircraft during engine run-up and being particularly adapted to abate the noise resulting from such run-up comprising, a rotatable floor element on which the aircraft may be positioned, a roof element rotatable with said floor element, and a plurality of screen elements extending vertically between said floor element and said roof element, at least some of said screen elements being rotatable about a vertical axis.

2. The combination of claim 1 wherein said roof element is vertically adjustable.

* * * * *

PO-1050
(5/69)

UNITED STATES PATENT OFFICE
CERTIFICATE OF CORRECTION

Patent No. 3,842,941    Dated October 22, 1974

Inventor(s) Oskar Gerber

It is certified that error appears in the above-identified patent and that said Letters Patent are hereby corrected as shown below:

The Foreign Application Priority Data which reads

"August 17, 1971 Germany ..............2141689"

should read

"August 20, 1971 Germany ..............2141689"

Signed and sealed this 31st day of December 1974.

(SEAL)
Attest:

McCOY M. GIBSON JR.
Attesting Officer

C. MARSHALL DANN
Commissioner of Patents